Dec. 18, 1928.
C. W. JOHNSON
TRAFFIC SIGNAL
Filed Nov. 23, 1926
1,695,712
2 Sheets-Sheet 2
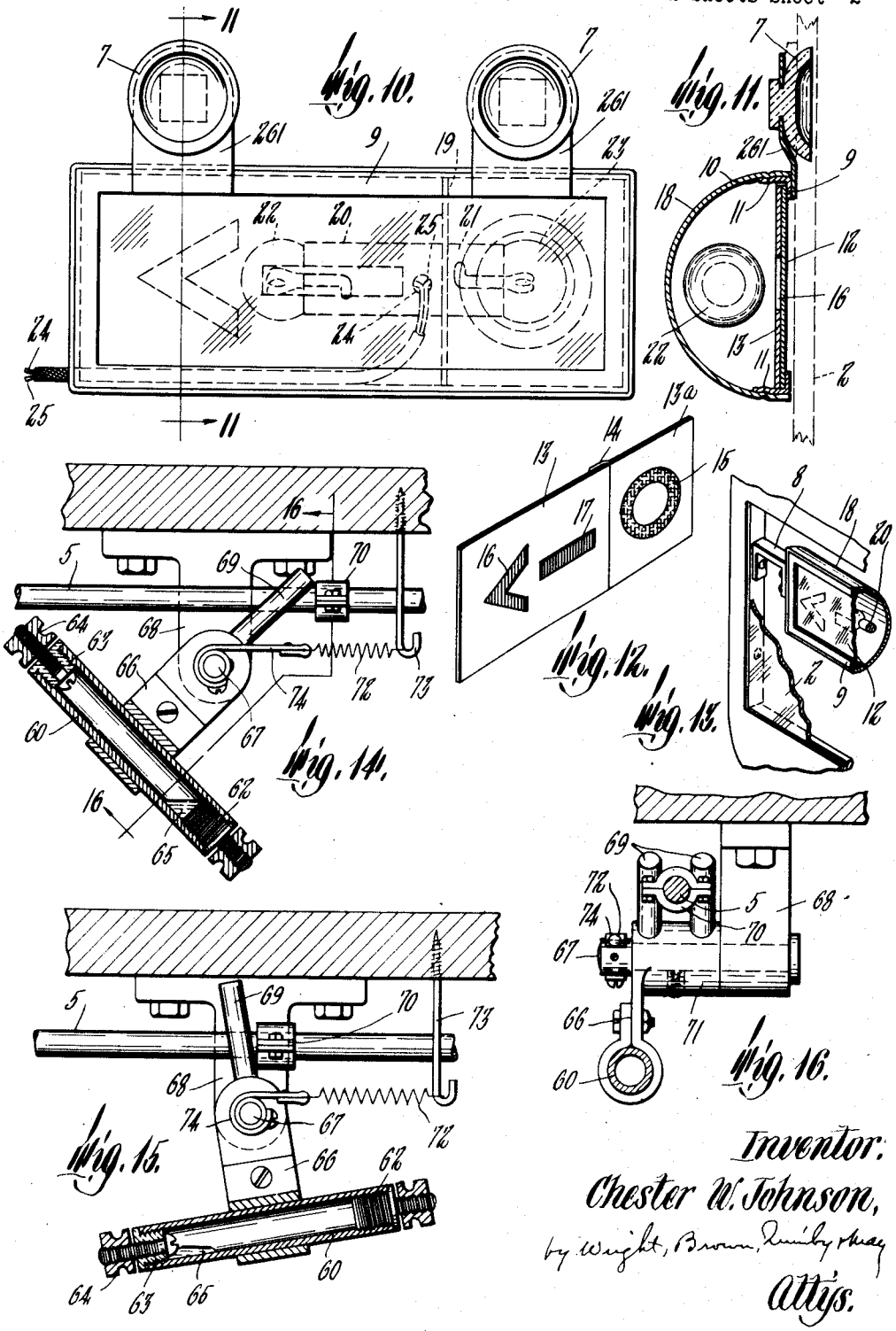
Inventor:
Chester W. Johnson,
by Wright, Brown, Quinby & May
Attys.

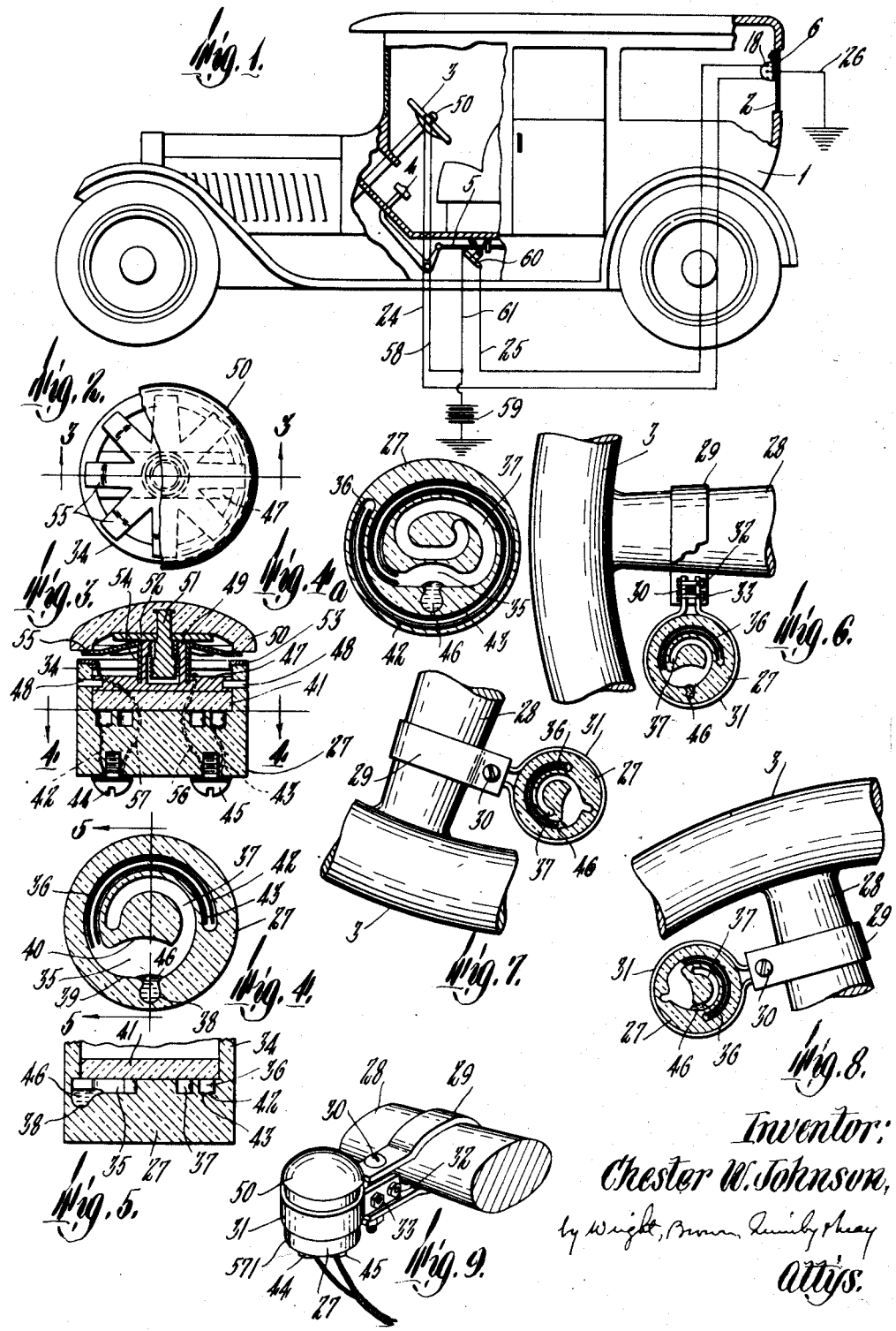

Patented Dec. 18, 1928.

1,695,712

UNITED STATES PATENT OFFICE

CHESTER W. JOHNSON, OF ALLSTON, MASSACHUSETTS, ASSIGNOR, BY MESNE ASSIGNMENTS, TO THE A. L. SMITH IRON WORKS, OF CHELSEA, MASSACHUSETTS, A CORPORATION OF MASSACHUSETTS.

TRAFFIC SIGNAL.

Application filed November 23, 1926. Serial No. 150,243.

The present invention relates to traffic signals for automobiles. It comprises means for giving a precautionary signal when the speed of the automobile is reduced by applying the brake, means for giving a direction signal automatically by turning the steering wheel preparatory to a change of direction, and preferably also associated means in connection with the last named means whereby the driver can operate the same direction signal and give the same warning before turning the steering wheel. Another feature of the invention preferably embodies an indicator adapted to be mounted in the rear window of the automobile, and includes novel structural features of such indicator however and wherever mounted. All of the several features of the invention are associated and combined in a unitary signal system, but the several parts thereof may be also applied in other combinations.

Having thus outlined the nature and general principles of the invention, I will now describe its preferred forms and embodiments in detail, with reference to the accompanying drawings, in which Fig. 1 represents conventionally an automobile of the sedan type with my signal invention applied thereto and illustrated diagrammatically;

Fig. 2 is a plan view in detail, partly broken away, of the circuit closer by which the direction signal is operated;

Fig. 3 is a cross section of said circuit closer taken on line 3—3 of Fig. 2;

Fig. 4 is a cross section of the same on line 4—4 of Fig. 3;

Fig. 4ᴬ is a cross section similar to Fig. 4, showing a modification of the switch;

Fig. 5 is a cross section on line 5—5 of Fig. 4;

Fig. 6 is a fragmentary view showing the circuit closer in section and illustrating a suitable mode of mounting the same on the hand steering wheel of an automobile;

Figs. 7 and 8 are similar views showing the steering wheel in different positions and illustrating the action of the circuit closer under such circumstances;

Fig. 9 is a perspective view of the fragmentary assemblage shown in Figs. 6, 7 and 8;

Fig. 10 is a plan view of the indicator portion of the signal device;

Fig. 11 is a cross section of the same on line 11—11 of Fig. 10;

Fig. 12 is a perspective view of the index or indicating element of this apparatus;

Fig. 13 is a fragmentary perspective view on a reduced scale of an alternative means of mounting the indicator in the window enclosure of an automobile;

Fig. 14 is a detail view, partly in elevation and partly in section, of a circuit closer forming part of the indicator apparatus and operable by the foot brake of the automobile;

Fig. 15 is a similar view showing the apparatus in a different position, i. e., the position for closing the circuit;

Fig. 16 is a sectional elevation on line 16—16 of Fig. 14.

Like reference characters designate the same parts wherever they occur in all the figures.

In now describing the preferred form of my invention in detail, it is to be understood that I do not limit the protection which I claim to the specific features of construction and arrangement thus described, except as required by the terms and intent of the claims as construed with reference to the prior art; it being my intention to protect all novel principles and features of the invention not only specifically, but also as broadly as their novelty permits.

The automobile shown conventionally in Fig. 1 includes a body 1 having a rear window 2 across which a glass pane is mounted, and it also has the usual hand steering wheel 3 and brake pedal 4 mounted on a lever to which a rod 5 for operating the brakes is connected. The signal 6 is preferably mounted in the rear window of the car and may be so mounted by vacuum suction cups 7 applied directly to the surface of the window pane, as indicated in Figs. 10 and 11; although it may be provided with a bracket 8, or a plurality of such brackets, at one or both ends, or elsewhere, secured to the window frame, as indicated in Fig. 3. However, it may be otherwise placed and arranged in conspicuous view of following drivers.

The element which I have thus called, for convenience, the signal, is preferably of the illuminated type and may have one or more indicators and a like number of illuminating lamps, or a multiple thereof. The form here shown has two indicators, one being a direction indicator, and the other a cautionary signal, with separate lamps for illuminating the respective signals; and it embodies also novel structural features leading to simplicity and low cost of manufacture, protection for the lamp or lamps, and ease of opening and closing for replacement of lamps, and other purposes.

In structure the signal device comprises an open frame 9, preferably rectangular, having along two of its sides, and preferably its intermediate sides or ends also, a flange 10 which is offset to form on the inner side a bead 11, or a succession of projections, and on the outer side a complemental groove or succession of indentations. A transparent or semi-transparent pane 12, which may be of glass, celluloid, or other suitable material, is placed against the frame 9 on the inside thereof, and next to the pane is placed the index or indicator 13, preferably a plate or pane which is opaque in part and transparent or translucent over parts of the area, which parts are formed or outlined to serve as conventional symbols or indices. These panes or plates 12 and 13 are of a width sufficient to spring the beads or projections 11, at opposite sides, apart when placed in the frame, and to be retained by such beads or projections, substantially as shown in Fig. 11. The index plate may be glass made opaque in part by a coating of paint or a layer of opaque material, and may be colored distinctively over the transparent or translucent index area. Or it may be an opaque plate cut out like a stencil as to the parts through which light is intended to shine, and the pane 12 may be treated to diffuse the light passing through it. As shown in detail in Fig. 12, the index plate is made in two parts 13 and 13ª, one of which has an offset lip 14 overlapping the other, but this is a feature which may be departed from. The translucent area 15, in this embodiment a ring-shaped area, is designed to serve as a precautionary signal, and the translucent areas 16 and 17, having a general appearance of an arrow, are designed to serve as a direction signal to give a warning when the driver is preparing to make a left turn. But instead of the precautionary signal 15, an opposite direction index may be substituted to signify a right turn. The structure as thus far described is combined with a complemental hollow structure 18 to form a complete housing in which the lamps are enclosed. In this embodiment the hollow structure is a sheet of metal approximately semi-cylindrical in form, with end walls and an intermediate partition 19. The edges of the semi-cylindrical part and of the end walls embrace the flanges 10 of the frame and are indented at a suitable number of points to form a bead or projection adapted to interlock with the groove or indentations of the flanges 10, so as to hold the parts of the housing or casing securely together. These overlapping parts are sufficiently flexible and resilient to permit separation and assemblage by manipulation with exertion of a moderate amount of strength. The wall 19 carries lamp sockets 20 and 21 which may be of any of the types now known and used for mounting the electric lamps of automobiles, or may be of other suitable construction. Incandescent lamps 22 and 23 are mounted in these sockets. The partition 19 divides the casing into two chambers, in each of which one of the lamps is located, and excludes from either chamber the light permitted by the lamp in the other. The location of the partition is between the index area 15 on the one side and the areas 16 and 17 on the other. A cable carrying wires 24 and 25 to the respective lamps is led into the casing through any conveniently located opening. The lamps are both grounded on the metallic structure of the automobile by a wire 26 shown diagrammatically in Fig. 1, which is connected at any convenient point to the casing of the signal and may be led therefrom with the wires 24 and 25 to a convenient point of connection with the automobile structure. Lugs 261, 261 carrying the vacuum cup 7 previously mentioned, are soldered or otherwise secured to the frame 9.

The lamp 22 for the direction indicator is controlled by a circuit closer 27, shown in detail in Figs. 2–5, and mounted on the steering wheel 3 so as to be operated automatically as the result of turning the wheel preparatory to a change in direction of the course of the automobile. Such circuit closer may be mounted on a spoke or the rim of the wheel, and is here shown as mounted on one of the spokes 28, a clip band 29 being provided for that purpose, formed to surround the spoke and having ears, and a screw 30 passing through such ears, for tightening it on the spoke. A second clip band 31 surrounds the body of the circuit closer and is provided with ears which embrace the screw 30 and are drawn together by screws 32 and 33 also embracing the screw 30. In this way provision is afforded for adjusting the circuit closer angularly about the screw 30 as a pivot; and in addition the circuit closer is adjustable angularly without limit in the clip 31, being made of cylindrical form externally to permit of such adjustment.

Now describing the circuit closer in detail with reference particularly to Figs. 2, 3, 4 and 5, the same comprises a body or base of substantial thickness, with an annular extension 34 at one end. This body is made of suitable insulating material, preferably bakelite, although other known insulating materials may be used. Recesses are formed inwardly from the plane surface of the base at the bottom of the chamber within the extension or rim 34. These recesses provide a chamber 35, from one end of which an arcuate channel 36 leads and extends through preferably about 180° around the center of the base. The angular extent of this channel may be greater or less than 180°, but is preferably at least as much as that, for reasons later described, and may easily be made much more than that by carrying the channel outside of and beyond the pocket 38 (later described) and making the diameter of the base large enough and locating the pocket far enough inward from the circumference to provide room for the extension of the channel, as shown in Fig. 4ª. From the other extremity of the chamber 35 a second channel 37 leads and also extends through a considerable angular extent, preferably about 180° around the same center. These channels are separated from one another except as they both open into the same chamber, and one of them is embraced by the other. The inner channel may be continued on a contracting volute curve as, and if, needed to give it an angular extent of much more than 180°. At the outer or lower side of the chamber is a narrow pocket 38 to contain mercury, the entrance to which is rounded so as to merge on a smooth curve with the wall 39 of the chamber. Preferably the mouth of the pocket is slightly narrower than the greatest width of the pocket beyond the mouth. The wall 40 of the chamber opposite to this pocket is concave and serves the purpose of a baffle, as later described. The chamber and channels are preferably of uniform depth below the bottom surface of the recess from which they are sunk, except only in the region of the pocket 38, where the depth is somewhat increased, as shown in Fig. 5.

Said chamber and channels are closed by a disk 41 of similar insulating material, which fits within the rim 34 and overlies the chamber and channels and preferably united with the material of the base which bounds the chamber and channels. Such union may be caused by a nonconductive cement or adhesive, or by fusion between the base and the cover disk. But before being hermetically sealed, the air is exhausted from the channels by suitable apparatus already known and available for the purpose, in order to avoid oxidizing the mercury employed to close the circuit and to avoid trapping of air in the channels when the mercury enters either of them. Thus the channels are completely enclosed and separated from one another so as to prevent the mercury, a body of which is used in this apparatus to complete the circuit, from flowing or being thrown directly from one channel to the other.

The foregoing is the preferred mode of making the circuit closer base and forming enclosed chambers therein. I am not limited to this method, however, but may obtain the same result in other ways.

Electrical conductors 42 and 43 are embedded in the bottom of the channel 36 and extend throughout substantially its entire length. They are entirely separated from each other. One of them, in this instance the conductor 42, continues through the body of the base into electrical connection with a binding screw 44, and the other one, 43, also extends through the body and makes electrical connection with a second binding screw 45. For closing the circuit, a body of mercury 46 is provided, in volume sufficient to fill the pocket 38 and rise slightly above the mouth of such pocket when the base is placed with the pocket downward, as shown in Fig. 4. The conductors 43 and 44 are exposed in the channel 36 so as to make contact with the mercury when the latter is caused by rotation of the circuit closer to flow into this channel; but such conductors terminate at such a distance from the pocket 38 that a substantial angular movement of the circuit closer as a whole is required before the mercury will flow into contact with them.

A bar 47 of conductive material is set into the chamber within the rim 34 and is secured by pins 48 driven into its ends through such rim. From this bar rises a sleeve portion 49 which is externally threaded at and adjacent to its upper end, and in its inner part has a socket wider than the threaded part. A button 50, carrying a stem 51, is mounted on the sleeve 49, and its stem enters the chamber therein. The end part of the stem is threaded, but its shank back from the threaded part is reduced in diameter. The threads of the stem are complemental to the internal threads of the sleeve, but both threads are short enough to permit the threaded part of the stem to pass entirely into the enlarged chamber in the sleeve, thus enabling the button to be mounted on the circuit closer base with freedom for tilting movement, and at the same time to be interlocked therewith (by the overlapping threads) so that it will not accidentally come off. It can be removed at need without difficulty, but only by a careful manipulation to enter its thread into the thread of the sleeve. A wear plate 52 is provided between the inner surface of the button and the outer end of sleeve 49 to support the button when it is rocked about any point on the end of the sleeve as a fulcrum. The need of such a wear plate, of hard metal or other material, arises when the button is made of rubber composition or bakelite, or other material of inferior resistance to wear in these circumstances.

A ring 53 of conductive material is mounted on the end of the rim 34, and a sleeve or hub 54, also of conductive material, is mounted on the sleeve 49. This hub carries outwardly projecting spring arms or fingers 55, preferably integral therewith and extending over the ring 35 and under the edge of the button 50. Their resilience and initial set normally hold them separated from ring 53 and they also support the button. But by pressing the button downward bodily or depressing its edge at any point and thereby tilting it, one or all of the fingers 55 may be brought into contact with the ring. A conductor 56 leads from the binding screw 45 into electrical connection with the bar 47 and hub 54, and another conductor 57 leads from the binding screw 44 into electrical connection with the ring 53, passing the bar 47 without making contact with it. These conductors may be molded in the base of the circuit closer, or threaded through holes formed in it. Obviously, when contact is made between any of the spring arms 55 and the ring 53, the electrical circuit in which the binding screws 44 and 45 are connected is closed.

In putting this circuit closer to use, the body thereof is mounted in any convenient position on the steering wheel 3, with the pocket 38 at the low side. In order that this may be determined readily, a mark or other index 571 is applied to the outside of the circuit closer base in a known relation to the pocket. Before thus applying the circuit closer, the steering road wheels are set straight, or due allowance is made for their deviation from the forward and rear line, and for the corresponding position of the hand wheel. Then one of the binding screws 44 or 45 (it is immaterial which) is connected by a wire 58 with the storage battery 59 of the car, or other source of electrical current, and the other binding screw is connected with an extension of the wire 24 leading from the lamp 22 of the direction index in the signal.

It will now be apparent that when the stering road wheels are straight, the body of mercury 46 is at the lowest point of the interior passageways in the circuit closer and does not close the circuit of the signal lamp. When the steering wheel is turned in left-hand rotation to make a left turn, the pocket 38 is raised and tilted and the mercury runs out of it and fills the space between the conductors 42 and 43 when the wheel has been turned far enough. A wide enough angular separation is made between the mercury pocket and the nearest point at which these conductors are exposed to permit the ordinary movements of the wheel in steering along a straight or somewhat winding road without closing the circuit. Such separation, however, does not delay the closing of the circuit when a turn is to be made into a cross street or other widely diverging branch of the road, because then the steering wheel is turned through a relatively wide angle before the car turns aside. The provisions for angular adjustment of the circuit closer, previously described, make possible a very close and exact determination of the angle through which the wheel may be turned without operating the signal. Premature escape of the mercury from the pocket with a slight turning of the wheel is prevented by the formation of the pocket and its bounding walls. Due to this formation, as shown in the drawings and previously described, and to molecular force acting in the body of mercury itself, the mercury does not leave the pocket until the wheel has been turned through an appreciable angle, and then it all runs out and crosses the space between the conductors. The position of the steering wheel and circuit closer when this has just occurred is shown in Fig. 7. Proper determination of the body of mercury is important in this connection also, and enough mercury is provided to fill the pocket and rise somewhat above the mouth thereof, but not enough to overflow and cause separation of a globule from the mass. As is well known, molecular force exerts a substantial resistance to division of a body of mercury, and this is availed of to retain the mercury in the pocket until the proper time, then to cause all of it to be discharged in a body.

As the wheel is turned further, the mercury runs onward into the channel 36, reaching its end after about 270° of rotation. All this time the circuit remains closed, because the wires 42 and 43 are exposed throughout the length of the channel and are bare, and the distance apart of the wires and the transverse dimensions of the channel at all points are such as to insure that the mercury will bridge across between the wires at every point.

If the wheel continues to be turned after the mercury has reached the closed end of the channel, the mercury is lifted until the closed end comes uppermost and then it runs back toward the entrance of the channel, but owing to the fact that the channel extends through 180° or more, the mercury then remains in it and in contact with the wires. The same action is repeated when the wheel is turned further, wherefore it follows that the wheel may be turned through a complete rotation, or any number of complete and fractional rotations without causing the circuit to be broken. Opening of the circuit occurs only when the wheel is turned reversely until the pocket is at the low side of the circuit closer. But by extending the channel through as great an angle as the wheel is turned from central to hand over position, or that angle less 180°, the mercury will not run back until the wheel is returned to central position and the road wheels are straight. When the steering wheel is turned in right hand rotation, the mercury runs in the channel 37 and stays there, however far the wheel is turned, without running back and into circuit closing position, owing to the circular formation and angular extent of the channel. The behaviour of the mercury in this channel is the same as that in the channel 36, as above described. On turning the wheel back, the mercury returns to the pocket. The exhaustion of air from the interior spaces enables the mercury to run quite, or practically, to the closed end of each channel.

Extremely violent oscillations of the car in going over a rough road at high speed, or bumps encountered when the car is inclined forward and going down hill, may throw the mercury out of the pocket, but if so, the concave baffling surface 40 obstructs it and causes it to fall back immediately into the pocket without entering either channel and becoming trapped therein.

It may be observed that the wires 24 and 58 may be led to the circuit closer along or inside of the steering wheel post and carried thence under the wheel to the circuit closer, with enough slack to permit the ordinary turning movements of the wheel.

In case the driver wishes to give advance warning of his intention to turn aside, he may do so by pressing downward on any part of the button 50, thereby closing the second or shunt circuit of the signal light through the conductors 56, 57, any or all of the arms 55, and the ring 53.

In the combination here shown, the precautionary signal is operated when the brake pedal 4 is depressed, and for this purpose I have provided a circuit closer 60 connected to a wire 61 from the source of current and to the wire 25 leading to the signal lamp 23. In its preferred construction, shown in Figs. 14, 15 and 16, the circuit closer 60 is a tube of metal or other electrical conductive material having in one end a screw plug 62 which provides a binding post for one of the conducting wires and is in electrical contact with the tube; and having in its other end a bushing 63 of insulating material carrying a screw 64 to which the end is exposed in the tube but is not in electrical connection therewith. In the tube is a body of mercury 65. Normally, the tube is held in an inclined position with the mercury at the end removed from that in which screw 64 is located; but when the brake pedal is depressed, the tube is tilted over far enough to allow the mercury to run to the opposite end and there complete an electrical connection between the wall of the tube and the head of screw 64, as shown in Fig. 15. To give the necessary angular movement for this purpose to the circuit closer, with a smaller angular movement of the brake pedal, I prefer to mount the circuit closer in a clamp 66 which forms one arm of a lever pivoted by a pin 67 to a bracket 68 of any suitable sort secured to the under side of the car body, and having a second arm 69 in the path of an abutment 70 on the brake rod 5. Said abutment may be a collar clamped on the brake rod, or may be otherwise formed. As here shown, the arm 69 is formed by two rods projecting from the hub 71 of the lever 66 and straddling the brake rod. A spring 72 is connected at one end to an anchor hook 73, and at its other end to a strap 74 wrapped around a drum on the lever 66 concentric with the pivot thereof, such spring normally holding the circuit closer in its open position shown in Fig. 14.

This circuit closer is simple and inexpensive to make and is not liable to get out of order or to be injured by water or dirt, even though mounted beneath the car body in an exposed position. This is due to the fact that the contact is closed and opened by the body of mercury entirely encased within the shell and between the plugs at the ends thereof and that such plugs can be and are sealed, to be tight against entrance of foreign matter of any kind. The projecting ends of the binding posts are readily accessible for connection of the conducting wires.

While the illuminated index and a lamp for illuminating the same constitute the preferred embodiment of the indicating part of my signal, the invention broadly is not limited to this type of index, but may include other electrically operated indicating means capable of being operated by opening and closing an electric circuit. Hence the illuminated index and lamp are typical in a broad way of any electrically operated indicator which may be used in the combination of this invention or in connection with either or both of the circuit closers thereof. Further, the two forms of circuit closer comprised within this invention are generically alike in that they are operated to close and open the circuit by angular movement and the displacement which is thereby given to a mobile circuit closing element, in this case a confined body of mercury. They are further alike in that they are given an angular movement by operation of one of the control members of the automobile; in one case by the steering control wheel, and in the other case by the brake controlling pedal or lever. It is to be understood that the circuit closer which is operated by the brake controller may be otherwise mounted than as shown, for instance, directly on the lever which carries the foot pedal, although a mounting such as illustrated is preferred, because a wider angular movement is thereby given to the circuit closer than that of the foot pedal lever in setting the brakes. And of course it is not necessary that this circuit closer be associated with a foot operated brake rather than a hand operated brake. In this sense, the foot brake is typical of any brake controller operable by the driver, and the claims are to be construed accordingly.

What I claim and desire to secure by Letters Patent is:

1. An electric switch comprising a base of non-conducting material having an enclosed interior pocket containing a body of mercury and having channels extending oppositely from opposite extremities of said pocket, curvilinearly about a common center, and separated conductors running throughout substantially the entire length of one of said channels and adapted to make electrical contact at any point in their length with the mercury body when in said channel; said body being adapted, when rotated about an axis other than vertical, to spill the mercury from the pocket into one or the other of the channels according to the direction of such rotation.

2. A circuit closer comprising a body of non-conductive material having an enclosed interior chamber, channels extending from opposite extremities of said chamber and a pocket at one side of the chamber intermediate the entrances to said channels, a body of mercury occupying and substantially filling said pocket and adapted to run out of the same when the circuit closer body is turned angularly, and separated electrical conductors extending longitudinally throughout substantially the full length of one of said channels to make contact with the mercury when the latter flows into said channel.

3. A circuit closer comprising a body of insulating material having in its interior an enclosed chamber and channels, and a body of mercury therein, said channels opening into said chamber at opposite extremities thereof and having an arcuate form, and the chamber having a pocket in its outer wall approximately midway between the entrances to the channels adapted to contain the mercury body when the circuit closer is placed with the pocket downward, the wall of the chamber opposite the said pocket having a concave formation between the channel entrances to serve as a baffle, and separated bare electrical conductors extending lengthwise in one of said channels.

4. In combination with the steering wheel of a vehicle, a signal controlling switch associated with said wheel to be rotated in an inclined plane by turning of the wheel, having a passage extending upwardly to right and left from its lowest point, a mobile body of electrically conductive material contained in said passage and adapted to gravitate therein upon turning the wheel to either direction from a neutral position, and separated electrical conductors, located in a part of said passage at one side of the lowest point, with which said mobile body is adapted to make contact when the wheel is turned in one direction.

5. A circuit switch for attachment in an inclined plane to the inclined steering wheel of an automobile, having an enclosed chamber containing a body of mercury and a channel extending from such chamber with progressive changes of direction whereby, when the switch is rotated by turning of the wheel with which it is engaged the mercury gravitates from the chamber into the channel and remains in the latter during progressive turning of the wheel, and separated electrical conductors extending along the channel adapted to be electrically connected therein by the mercury and to be electrically connected externally of the switch to a signal and a source of current.

6. The combination with the steering wheel of an automobile, of an electric switch mounted to be rotated in an inclined plane by turning of said wheel, having an internal pocket containing mercury and being at a lower level than the after-mentioned passage when the wheel is in neutral position, a passage leading from one side of such pocket with progressive changes of direction totalling more than 180° in the same direction of rotation, into and along which the mercury runs by gravity when the wheel is turned one way, and bare electrical conductors extending beside and out of contact with one another in said passage, with which the mercury makes contact when the wheel is so turned.

7. The combination with the steering wheel of an automobile, of an electric switch mounted to be rotated in an inclined plane by turning of said wheel, having an internal pocket containing mercury and being at a lower level than the after-mentioned passage when the wheel is in neutral position, a passage leading from one side of such pocket with progressive changes of direction totalling more than 180° in the same direction of rotation, into and along which the mercury runs by gravity when the wheel is turned one way, bare electrical conductors extending beside and out of contact with one another in said passage, with which the mercury makes contact when the wheel is so turned, and a second passage leading from the opposite side of the pocket with progressive changes of direction totalling more than 180° in the direction of rotation opposite to the turns of the first passage, into and through which the mercury runs when the wheel is turned the other way.

8. An automobile signal system comprising in combination with the steering wheel of the automobile arranged in an inclined plane, and an electric signal mounted visibly on the automobile, a switch mounted on the steering wheel having separated electrical conductors in electrical connection with said signal and a source of current, and the switch including a gravity actuated conductor and means for guiding said last named conductor from a position out of bridging connection with the first named conductors into bridging connection therewith when the wheel is turned in one direction from a neutral position.

9. The combination of an inclined steering wheel of an automobile, an electric switch having separated conductors, a movable contact body, and means for guiding said body into and out of bridging electrical connection with said conductors when the switch is rotated, said switch being coupled to the wheel and rotatable at an inclined plane thereby.

10. The combination of a steering wheel of an automobile, said wheel being arranged and rotatable in an inclined plane, and an electric switch mounted on said wheel and rotatable thereby; said switch having a relatively movable gravity controlled circuit closing element occupying the momentarily lowest point in its permitted path of movement in all positions of the switch, means for confining the relative movement of said element to a given path, and separated conductors coinciding in part with such path, whereby rotation of the switch with the wheel causes gravity impelled relative movement of the said element into and out of bridging contact with said conductors.

11. An electric switch comprising a base having means for attachment in an inclined plane to the inclined steering wheel of an automobile, a movable connector element, means for constraining said connector element to travel in a given path relatively to the switch base when the latter is rotated about a given axis, and a conductor extending along a portion of said path in position to be contacted with simultaneously by said connector elements when the latter is in such portions of its path.

12. A circuit closer comprising a base of non-conducting material having an enclosed interior pocket containing a body of mercury and having channels extending oppositely from opposite extremities of said pocket, each channel making progressive changes of direction of the same order amounting in total to at least 180°, and separated conductors running through substantially the entire length of one of said channels and adapted to make electrical contact at any point in their length with the mercury body when the latter is in said channel.

13. In an automobile signal system, the combination with the steering wheel shaft of the automobile having its axis in a position other than vertical, and an electric signal mounted on the automobile, of a circuit closer in electrical connection with said signal and a source of current, means mounting said circuit closer for movement with the steering wheel shaft in a plane substantially at right angles to the axis of said shaft, said circuit closer including a bent conductor, a movable gravity operated connector element normally out of contact therewith, and means for causing a gravity impelled movement of said connector element in a progressively curved path in contact with said conductor on movement of said shaft in one direction from normal and out of contact with said conductor on the movement of the shaft in the opposite direction.

In testimony whereof I have affixed my signature.

CHESTER W. JOHNSON.